June 1, 1965  B. B. MOHS  3,186,732
SIDECAR FOR A BICYCLE
Filed Oct. 9, 1963  3 Sheets-Sheet 1

INVENTOR.
BRUCE B. MOHS
BY *Joseph G. Werner*

ATTORNEY

INVENTOR.
BRUCE B. MOHS
BY *Joseph G. Werner*
ATTORNEY

INVENTOR.
BRUCE B. MOHS

ATTORNEY

United States Patent Office 3,186,732
Patented June 1, 1965

3,186,732
SIDECAR FOR A BICYCLE
Bruce B. Mohs, 2355 University Ave., Madison, Wis.
Filed Oct. 9, 1963, Ser. No. 314,972
4 Claims. (Cl. 280—203)

My invention relates to an improved sidecar for a bicycle.

One object of my invention is to provide a sturdy, lightweight sidecar which may be easily attached to and detached from a bicycle frame.

Another object of my invention is to provide a sidecar which may be securely attached to a bicycle frame completely to the rear of the pedal area, and which in no way interferes with the pedaling of the bicycle.

Other objects and advantages of my invention will be apparent from the following detailed description taken in conjunction with the accompanying drawings wherein a preferred embodiment of the principles of the invention has been selected for exemplification.

Figure 1:
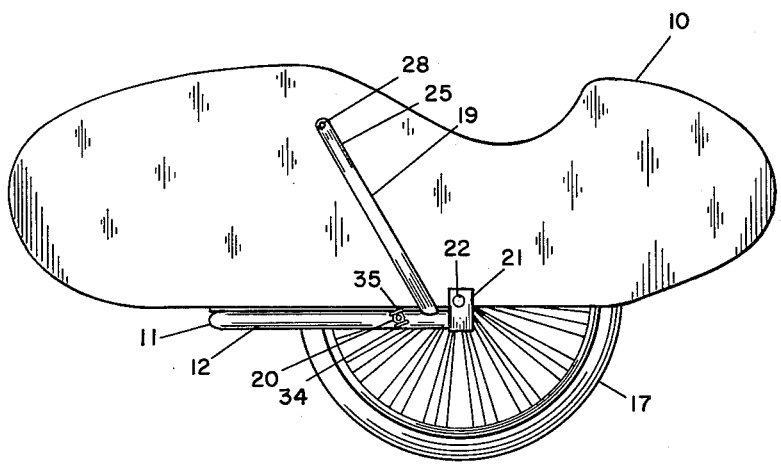
FIG. 1 is a left side elevation view of my novel sidecar.

The sidecar 10 of my invention may have any desired body construction of sufficient size to accommodate one or more children. The streamlined, sheet metal body construction shown in the drawings is exemplary only. What is essential to my invention is the construction of the frame 11 on which the sidecar 10 is mounted.

Figure 2:
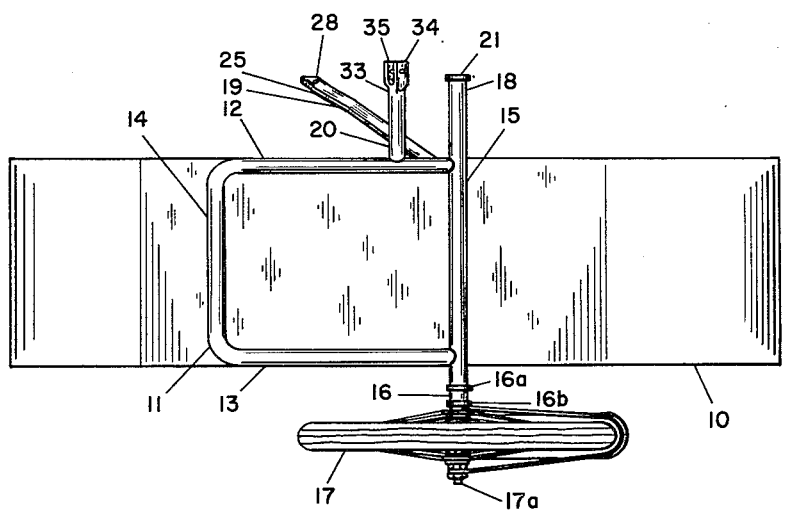
FIG. 2 is a bottom view of the sidecar of FIG. 1.

As best shown in FIG. 2, the frame 11 is substantially rectangular and preferably tubular. The inside leg 12, the outside leg 13, and the transverse legs 14 and 15 extending between the sides of the sidecar 10 form the rectangle. Preferably, the inside leg 12, the outside leg 13 and the transverse leg 14 comprise a single U-shaped element across the open end of which is secured the transverse leg 15 by welding or other suitable means. The sidecar 10 is secured to the frame 11 by any suitable means.

The inside end 18 of the transverse leg 15 is adapted for fixed attachment to the rear axle 23 of the bicycle to which the sidecar 10 is attached. Slightly forward from the transverse leg 15 a brace 19 projects obliquely upward and outward from the inside leg 12. A substantially horizontal arm 20 also projects from the inside leg 12 at a point slightly forward from the brace 19.

Figure 3:
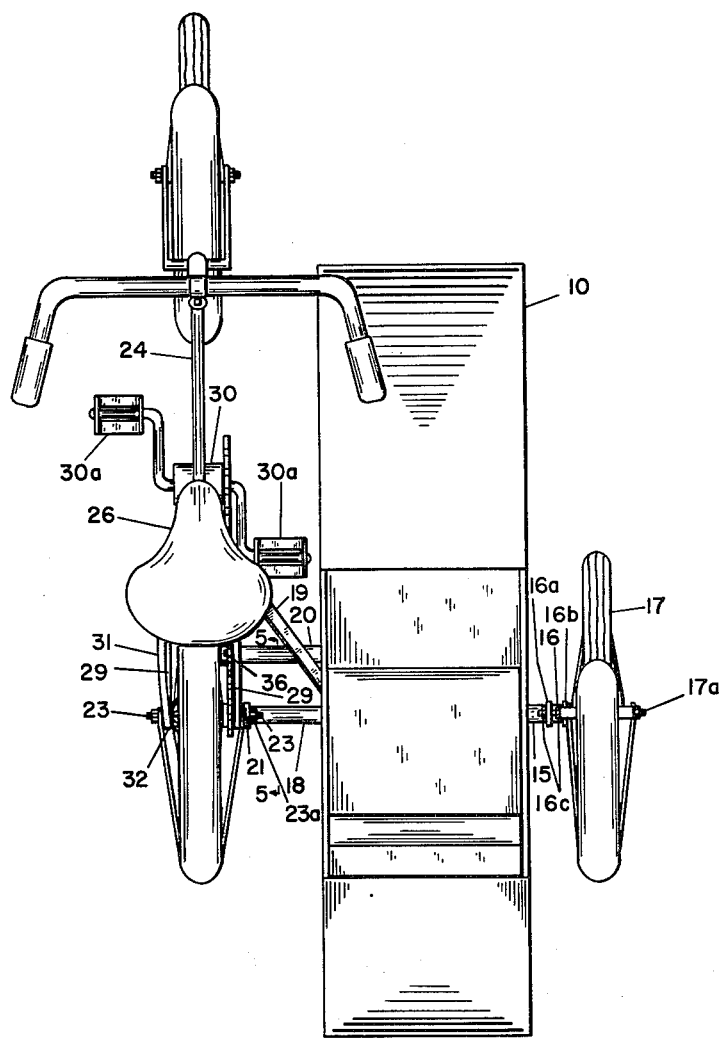
FIG. 3 is a top view of my sidecar attached to a partially shown bicycle.
Figure 4:
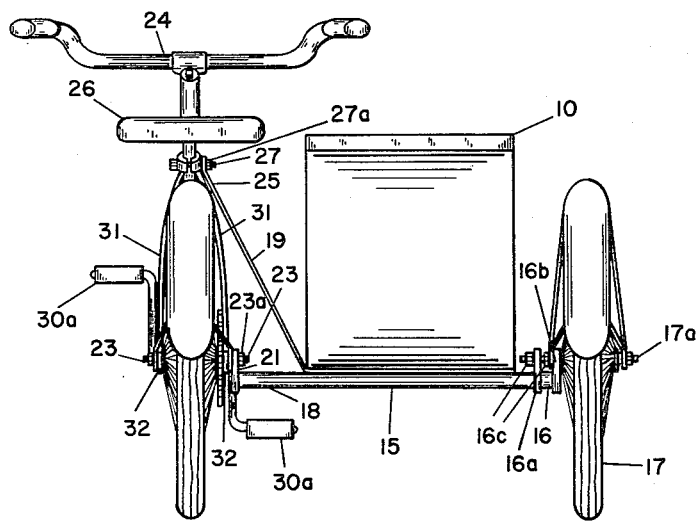
FIG. 4 is a rear view of my sidecar attached to a partially shown bicycle.

The frame 10 is attached to any standard bicycle by means of the above mentioned transverse leg 15, brace 19 and arm 20, as shown in FIGS. 3 and 4. Preferably, the inside end 18 of the transverse leg 15 fixedly carries an inner plate 21 with an opening 22 shown in FIG. 1. The opening 22 is adapted to receive the rear axle 23 of the partially shown bicycle 24. The inner plate 21 and attached transverse leg 15 are preferably secured to the bicycle rear axle 23 by means of nut 23a, as shown.

The outside end 16 of the transverse leg 15 is adapted to support the axle 17a for the sidecar wheel 17. As shown in FIGS. 2-4, a pair of outer plates 16a and 16b are mounted on the transverse leg outside end 16 in spaced relation. The outer plates 16a and 16b have aligned openings through which the axle 17a is extended. The axle 17a is secured to the outer plates by nuts 16c in fixed relation. Use of the inner plate 21 and outer plates 16a and 16b permits the transverse leg 15 and the other elements of the sidecar frame 11 to be lowered below the level of the axles 23 and 17a to provide a lower center of gravity for the side-car 10. By varying the size of the plates and the distance above the transverse leg 15 that the openings for the axles are located, the clearance of the sidecar and its center of gravity may be varied as desired.

The free end 25 of the brace 19 is attached to the bicycle 24 in the area of its saddle 26 by any suitable means. A preferred way is to secure the free end 25 to the bolt 27 onto which nut 27a is threaded to tighten the saddle 26 in the bicycle frame. An opening 28 is located in the free end 25 to receive the bolt 27.

A standard bicycle frame usually divides into two rear lower fork arms 29 as it extends rearward from the housing 30 for the pedals 30a. These lower fork arms 29, which usually slope slightly upward from the horizontal, extend rearwardly from the housing 30 to the point at which they combine with the rear upper fork arms 31 extending downward from beneath the saddle 26 to help form the rear fork 32 for mounting the rear axle 23 of the bicycle 24. The sidecar horizontal arm 20 is attached to the immediately adjacent lower fork arm at a point slightly forward of the end of rear fork 32. The point of attachment to the lower fork arm 29 is a considerable distance behind the adjacent pedal 30a when the pedal is in its most rearward position, as shown in FIG. 3. Because of this careful location of the horizontal arm 20, it does not interfere with the child's foot or heel while he is pedaling the bicycle.

Figure 5:
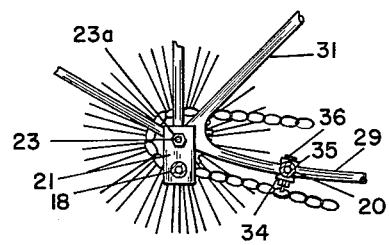
FIG. 5 is sectional view showing the attaching connections of the sidecar to the lower rear fork and axle.

Any suitably rigid means for attachment of the horizontal arm 20 to the bicycle lower fork arm 29 may be used. In the illustrated embodiment, the free end 33 of the arm 20 carries a C-clamp with upper and lower fingers 34 and 35 which are adapted to engage the lower fork arm 29, as shown in FIG. 5. A bolt 36 is inserted through corresponding openings in the fingers 34 and 35 to tighten the fingers firmly around the lower fork arm 29.

My novel sidecar is an inexpensive and useful attachment for a bicycle, and a bicycle equipped with it makes an exciting and intriguing toy for children. In addition, it is a device which is their own. Because of its sturdy, easily understood construction, even a young child is able to safely attach the sidecar to and remove it from his bicycle without the aid of a grownup.

Moreover, my sidecar is safe for use by children. The transverse leg 15, the brace 19 and the arm 20 serve to firmly and securely attach the sidecar to a bicycle. There is virtually no danger that the sidecar can detach itself from a bicycle. Yet the brace 19 and the arm 20 in no way interfere with the normal operation of the bicycle.

It is understood that my invention is not confined to the particular construction and arrangement of parts herein illustrated and described, but embraces all such modified forms thereof as come within the scope of the following claims.

I claim:

1. A sidecar for a bicycle,
 (a) said sidecar mounted on a frame,
 (b) said frame having an inside leg running along one side of said sidecar and a transverse leg extending in lateral relation to said side car and intersecting said inside leg,
 (c) means attached to one end of said transverse leg to fixedly engage the rear axle of said bicycle in detachable relation,
 (d) a substantially straight rigid brace with a free end projecting obliquely from said inside leg at a point of rigid connection slightly forward from said transverse leg,
 (e) said free end of said brace being adapted to be detachably secured to the frame of said bicycle in the area of its saddle,
 (f) an arm with a free end projecting outwardly from said inside leg at a point slightly forward from said brace,
(g) said free end of said arm being adapted to be detachably secured to one of the lower fork arms of a bicycle in rigid relation.

2. The sidecar of claim 1 wherein the arm is adapted to be secured to one of the lower fork arms of said bicycle frame at a point spaced slightly forward from the rear axle of the bicycle such that said arm will not interfere with the pedaling of the bicycle.

3. A sidecar for a bicycle,
(a) said sidecar having a body and a substantially rectangular frame for supporting said body,
(b) said frame comprising an inside leg and an outside leg extending in substantially parallel relation to the longitudinal axis of said sidecar, and a forward transverse leg and a rear transverse leg extending in lateral relation to said sidecar.
(c) a wheel rotatably mounted on the outside end of said rear transverse leg in supporting relation,
(d) the inside end of said rear transverse leg being adapted to fixedly engage the rear axle of said bicycle in detachable relation,
(e) a substantially straight rigid brace with a free end projecting obliquely from said inside leg at a point of rigid connection slightly forward from said rear transverse leg,
(f) said free end of said brace being adapted to be detachably secured to the frame of said bicycle in the area of its saddle,
(g) a substantially horizontal arm with a free end projecting outwardly from said inside leg at a point slightly forward from said brace,
(h) said free end of said arm being adapted to be detachably secured to one of the lower forked arms of said bicycle frame in rigid relation.

4. The sidecar of claim 3 wherein the substantially horizontal arm is adapted to be secured to one of the lower forked arms of said bicycle frame at a point spaced slightly forward from the rear axle of the bicycle whereby said substantially horizontal arm will not interfere with pedaling the bicycle.

References Cited by the Examiner

UNITED STATES PATENTS

| | | | |
|---|---|---|---|
| 1,212,350 | 1/17 | Harley | 280—203 |
| 1,235,177 | 7/17 | Young | 280—203 |
| 1,513,165 | 10/24 | Exum | 280—203 |
| 2,822,879 | 2/58 | Overton | 280—203 X |

MILTON BUCHLER, *Primary Examiner.*

KENNETH H. BETTS, *Examiner.*

UNITED STATES PATENT OFFICE
CERTIFICATE OF CORRECTION

Patent No. 3,186,732                                        June 1, 1965

Bruce B. Mohs

It is hereby certified that error appears in the above numbered patent requiring correction and that the said Letters Patent should read as corrected below.

Column 3, line 5, after "bicycle" insert -- frame --.

Signed and sealed this 30th day of November 1965.

(SEAL)
Attest:

ERNEST W. SWIDER                                  EDWARD J. BRENNER
Attesting Officer                                       Commissioner of Patents